United States Patent
Dreyer et al.

(10) Patent No.: US 8,434,211 B2
(45) Date of Patent: May 7, 2013

(54) METHOD FOR MANUFACTURING A CAPACITIVE MEASURING APPARATUS

(75) Inventors: Volker Dreyer, Lorrach (DE); Armin Wernet, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 62 days.

(21) Appl. No.: 13/120,760

(22) PCT Filed: Aug. 12, 2009

(86) PCT No.: PCT/EP2009/060408
§ 371 (c)(1),
(2), (4) Date: Mar. 24, 2011

(87) PCT Pub. No.: WO2010/037586
PCT Pub. Date: Apr. 8, 2010

(65) Prior Publication Data
US 2011/0192017 A1 Aug. 11, 2011

(30) Foreign Application Priority Data
Sep. 30, 2008 (DE) .......................... 10 2008 049 623

(51) Int. Cl.
*G01R 31/28* (2006.01)

(52) U.S. Cl.
USPC ............ 29/593; 29/25.42; 29/594; 29/595; 29/609.1; 324/629; 361/278; 361/284; 702/55

(58) Field of Classification Search ............... 29/25.42, 29/592.1, 594, 595, 609.1; 73/1.73, 290 R, 73/304 C, 304 R; 361/278, 284; 324/629; 702/55
See application file for complete search history.

(56) References Cited

U.S. PATENT DOCUMENTS

| | | | | |
|---|---|---|---|---|
| 4,594,892 A | * | 6/1986 | Asmundsson | 73/304 C |
| 4,757,252 A | * | 7/1988 | Maltby et al. | 324/687 |
| 5,602,333 A | * | 2/1997 | Larrabee et al. | 73/149 |
| 6,016,697 A | | 1/2000 | McCulloch | |
| 6,295,869 B1 | * | 10/2001 | Delatte | 73/304 C |
| 6,938,478 B2 | * | 9/2005 | Arias | 73/304 R |
| 7,150,190 B2 | * | 12/2006 | Krufka et al. | 73/304 C |
| 7,946,148 B2 | * | 5/2011 | Getman et al. | 73/1.73 |

FOREIGN PATENT DOCUMENTS

| | | |
|---|---|---|
| DE | 198 17 722 A1 | 1/2000 |
| DE | 10 2005 008 207 A1 | 8/2006 |
| DE | 10 2005 053 330 A1 | 5/2007 |
| JP | 54-87610 | 7/1979 |
| JP | 57-87610 | 6/1982 |
| WO | WO 00/43735 | 7/2000 |
| WO | WO 2006/034959 A3 | 4/2006 |

\* cited by examiner

*Primary Examiner* — Paul D Kim
(74) *Attorney, Agent, or Firm* — Bacon & Thomas, PLLC

(57) ABSTRACT

A method for manufacturing a measuring apparatus for capacitive determining and/or monitoring of at least the fill level of a medium. The measuring apparatus has a probe unit and an electronics unit. During a measurement, the electronics unit supplies the probe unit with an exciter signal and receives from the probe unit a received signal, from which the electronics unit ascertains a capacitance value. The probe unit is coated with an insulation layer, the coated probe unit is connected with the electronics unit and inserted into a container containing a calibration medium, the coated probe unit is covered completely by the calibration medium and an associated received signal is gained, and, with the associated received signal, at least one adjustable component of the electronics unit is set.

7 Claims, 3 Drawing Sheets

The invention relates to a method for manufacturing a measuring apparatus for capacitive determining and/or monitoring at least of the fill level of a medium, wherein the measuring apparatus has at least one probe unit, and at least one electronics unit. During measuring, the electronics unit supplies the probe unit with an exciter signal and receives from the probe unit a received signal, and wherein the electronics unit ascertains from the received signal at least one capacitance value associable with a fill level of the medium. The medium is, for example, a bulk good or a liquid or a gas, or a combination of these media.

BACKGROUND DISCUSSION

Capacitive fill level measuring devices are known in the state of the art. The measuring principle is based on the fact that a probe unit, which is either a rod or a cable, and a second probe or the wall of the container in which the medium is located form the two electrodes of a capacitor, with the medium as a dielectric. Since the capacitance of this capacitor is, among other things, dependent on the fill level of the medium, the fill level can be deduced from the capacitance. Different options for measuring the capacitance are set forth, for example, in the Offenlegungsschrifts DE 101 57 762 A1 or DE 101 61 069 A1 of Endress+Hauser. For measuring, the probe is usually supplied with an exciter signal in the form of an electrical alternating voltage of a predeterminable frequency. The received signal extractable from the probe unit as the response signal is, in turn, usually an electrical current signal, which, for evaluation, most often is converted into an alternating voltage. From the received signal, there is obtained the capacitance of the capacitor, and therefrom, the fill level. The probe unit is most often coated with an electrically insulating layer, which permits continuous measuring of the fill level in the conductive media. An embodiment of the insulation is described, for example, in the Offenlegungsschrift DE 10 2005 053 330 A1.

A known problem lies in the fact that the medium can cling to the probe unit and an accretion forms. Such an accretion usually corrupts the measurement results or even prevents measurement. Further problematic is that the measured capacitance value not only depends on fill level, but also on the dielectric constant and the conductivity of the medium. Since the conductivity is influenced e.g. by temperature or humidity, these dependencies lead to measurement uncertainties, or limitations regarding application. Furthermore, the geometry of the container and, for example, accretion on the probe unit, also affect the measured values.

Another problem lies, due to the multiple dependence of the variables involved, in the associating of the capacitance value determined by the measuring and the fill level value actually of interest. Therefore, a calibration is most often required, in the case of which, after installation of the measuring device, different fill levels are brought about with the medium to be measured, and the capacitance values resulting in such case are saved. Such a calibration is, however, very complicated, and stands in the way of direct start-up of the measuring device following installation. Regarding this topic, the patent DE 195 36 199 C1 and the publication WO 2006/034959 A2 can be mentioned.

Furthermore, a problem lies in the area of the combining of probe unit and the electronics unit. The probe unit can, depending on the type of application and the need to be fulfilled, have markedly different lengths, this thus also meaning that, in each case, a markedly different bandwidth accompanies the capacitance values that can occur. The electronics unit nonetheless is designed for the maximum occurring value for the probe capacitance. This thus references the longest probe, and also the tolerances which can occur, for example, in the case of the insulation layer. Probe lengths lie most often between a few centimeters and about 30 meters. Equally, the tolerances of the insulations can also be very large. This leads to a large measuring range being provided in the electronics unit, which, however, is not fully utilized in all combinations of the electronics unit with different probe units. The actual measurement is most often implemented only with a markedly smaller measuring range. The resolution and the sensitivities in principle possible therewith, are, thus, not fully utilized. The susceptibility to EMC disturbances likewise increases therewith. A possibility is subdivision into a number of measuring ranges.

SUMMARY OF THE INVENTION

An object of the invention is to provide a manufacturing method, via which an optimized measuring range of a capacitive measuring device is achieved.

The object is achieved according to the invention by the features that the probe unit is coated with an insulation layer, the coated probe unit is connected with the electronics unit, the coated probe unit is inserted into a container with a calibration medium, the coated probe unit is covered essentially completely by the calibration medium, while the probe unit is essentially completely covered, an associated received signal is gained, and, on the basis of the associated received signal, at least one adjustable component of the electronics unit is set.

In the invention, thus, the calibration, i.e. the optimizing of the measuring range of the electronics unit, is done after the electronics unit and the probe unit are connected with one another. By the full covering of the probe with conductive medium, the maximum capacitance value achieveable for the particular probe unit is ascertained, and the measuring range of the electronics unit is especially optimally matched to the probe. The optimizing occurs, for example, by matching the probe voltage, by an evaluation of the electrical measurement current or also by a matching of the converting range of the analog/digital converter, which converts the analog received signal to a digital signal. The goal, in such case, is to set the electronics in such a manner, that they preferably work with their maximum possible resolution, accuracy and maximum insensitivity to EMC disturbances.

The effect of manufacturing tolerances of the probe can, thus, be eliminated in a simple manner. A further advantage is that, in one working step, the electronics are set, i.e. a calibration of the probe unit is performed, and, at the same time, a function test of the complete device occurs. Up to now, the electronics and the probe were first separately tested.

In an embodiment, the electronics unit is thus calibrated especially as a function of the length of the probe unit effective for the measuring. This means the electronic units are, in each case, tuned to the length of the probe unit, with which they will work.

In an embodiment, the analog/digital converter (which digitizes the signal received from the probe unit or an analog signal (e.g. a voltage signal) dependent thereon) is especially calibrated to the particular effective probe length; this means, for example, that the signal range in each case available from the analog/digital converter is especially completely utilized, i.e., in each case, completely referenced to the probe length, i.e. to the signal amplitudes possible in the case of the given probe length. In other words: The resolution is, in each case, essentially completely utilized for the given probe length.

If the settings are stored in a data memory, e.g. an EEPROM, then, during a repair, the settings can be assumed by the new electronics.

An embodiment provides that, based on the essentially complete covering, the greatest possible capacitance value is ascertained. In such case, the dependence on the character of the medium is also taken into consideration.

An embodiment includes that, with the associated received signal, a resolution of an analog/digital converter arranged in the electronics unit is set. The associated received signal references, in such case, the signal received in the case of complete covering. In such case, an optimizing of such a sort takes place, that essentially the entire resolution range available from the analog/digital converter is utilized, and this referenced to the particular probe length.

An embodiment provides that the probe unit is coated with an insulation layer in such a manner, that the thickness of the insulation layer lies in the micrometer range.

An embodiment includes that, with the associated received signal, that component of the electronics unit is set, which determines the amplitude of the exciter signal.

An embodiment provides that the amplitude of the exciter signal is set in such a manner, that a resolution range of the analog/digital converter is essentially completely utilized.

An embodiment provides that, with the associated received signal, at least one adjustable component of the electronics unit is set in such a manner, that the amplitude of the received signal is at its maximum in the case of complete covering.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
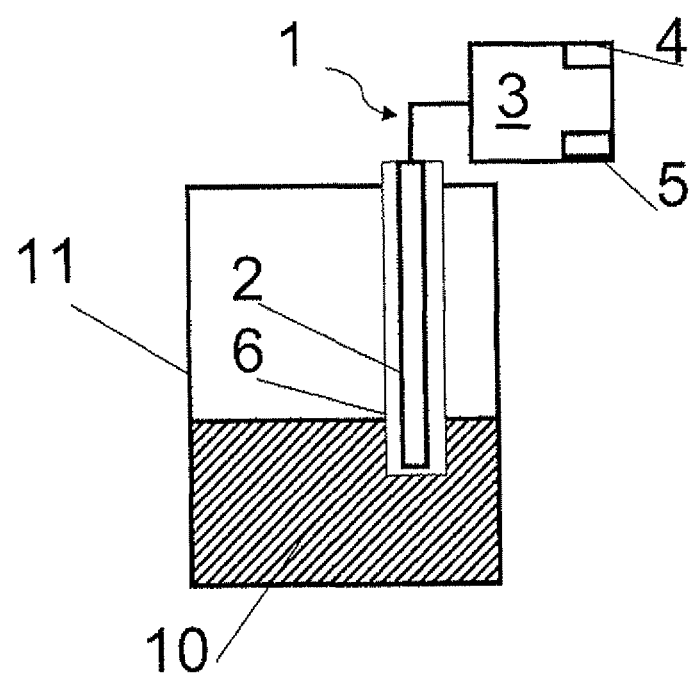
FIG. 1 is a schematic representation of an application of a measuring device of the invention.

FIG. 1 shows an application of the measuring device 1 for measuring fill level of a medium 10 in a container 11. The probe unit 2 is here a rod; alternatively, however, it can also be a cable. There are also arrangements with a plurality of measuring rods or cables. The probe unit 2 is surrounded by an insulation layer 6. The probe unit 2, the wall of the container 11 and the medium 10 together form a capacitor. For determining capacitance, the probe unit 2 is supplied by the electronics unit 3 with an electrical operating signal. Usually, such is an alternating, electrical voltage. From the response signal of the probe unit 2, the capacitance is then determined. The response signal is, in such case, most often an electrical current signal, which is converted in the electronics unit 3 to a voltage. Advantageously provided in this connection in the electronics unit 3 is an analog/digital converter 5, which converts the analog signal to a digital signal. From this digital signal, amplitude and phase of the received signal are then ascertained. Advantageously, a microprocessor is provided in the electronics unit 3. From the values of the response signal, the capacitance value is then determined. Via the mapping between capacitance value and fill level value obtained from the calibration and stored in the memory unit 4, the fill level of the medium 10 in the container 11 is then determined.

Figure 2:
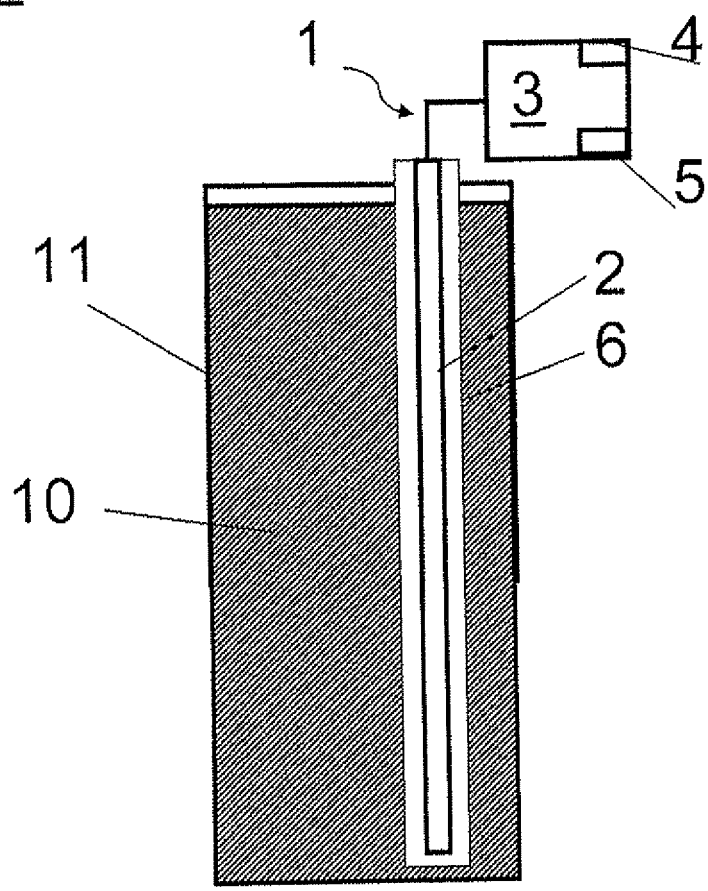
FIGS. 2 and 3 are two applications of differently embodied measuring devices, together with schematic representations of occurring measurement voltages.
Figure 2:
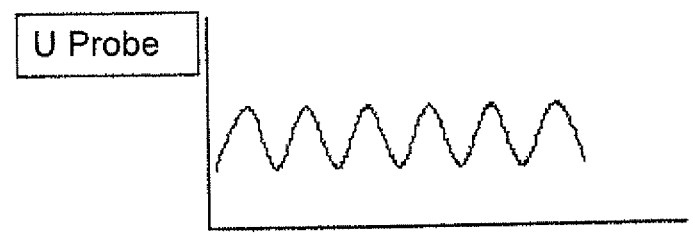
Figure 2:
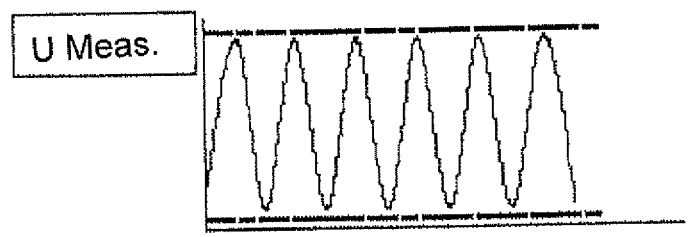
Figure 3:
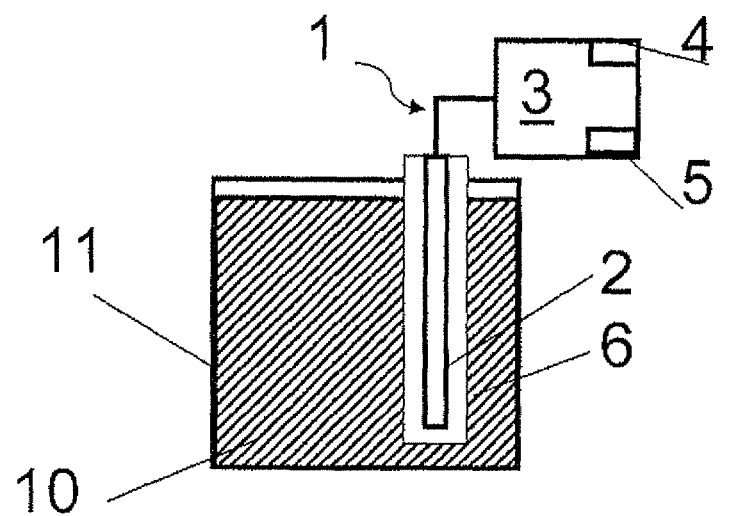
Figure 3:
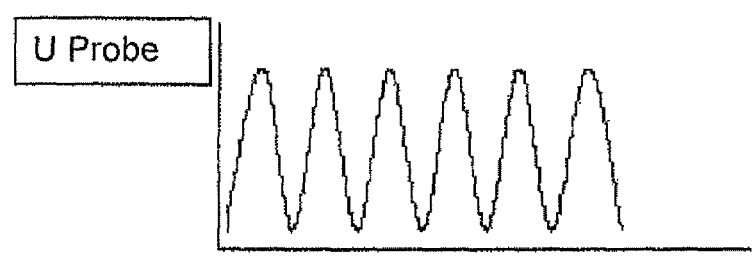
Figure 3:
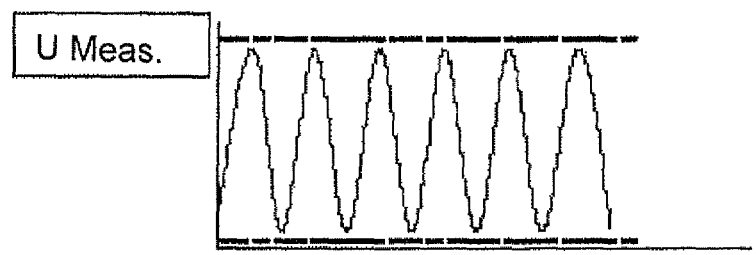

FIGS. 2 and 3 show schematic representations of applications of measuring devices of the invention, together with examples of signal curves, wherein the probes are, in each case, essentially completely covered by the medium. Thus, there is shown, in each case, the voltage, U Probe, with which the measuring probe is supplied and the measurement voltage, U Meas., derived from the probe signal for ascertaining fill level of the medium. In the curve of the received signal, U Meas., in each case, the resolution range available from the analog/digital converter is indicated with dashed lines.

With the implementation of the invention, the probe voltage is increased to an optimum level, until the measurement voltage resulting from the measurement capacitance almost completely utilizes the analog/digital converter range (shown by the dashed lines). Since the probe voltage is limited in its control range, for support, the evaluation resistor can be adapted for the measurement voltage. Through this adjusting, the electronics are always optimally matched to the probe characteristics with regard to resolution and insensitivity to disturbances.

According to the invention, during manufacture of the capacitive measuring devices, the probe unit is coated with an insulation layer. The type of insulation layer is, in such case, embodied, for example, as described in Offenlegungsschrift DE 10 2005 053 330 A1. In the case of such very thin layers, it is, partially due to the manufacture or the material used, under certain conditions not possible to optimally limit the tolerance of the thickness of the insulation.

Subsequently, the coated probe unit is connected with the electronics unit, i.e. the required electrical and/or mechanical contact is produced. In this step, thus, essentially the components of the actual measuring device are brought together.

For the subsequent calibration, the coated probe unit is inserted into a container containing a calibration medium. In order to ascertain the largest capacitance value to be expected as a function of the type of medium and calibration medium, respectively, for the particular embodiment, especially the length of the probe unit, the coated probe unit is essentially completely covered by the calibration medium, and the received signal associated with this fill level (in each case, the lower graph with U Meas.) is gained.

Proceeding from this received signal, the electronics unit is then optimized, wherein, in given cases, also that capacitance value is used, which occurs in the case of uncovered probe. Thus, for example, also the exciter signal (U probe) is optimized.

The invention claimed is:

1. A method for manufacturing a measuring apparatus for capacitively determining and/or monitoring of, at least, the fill level of a medium wherein the measuring apparatus has at least one probe unit, and at least one electronics unit, the method comprising the steps of:

supplying during a measurement, with the at least one electronics unit the at least one probe unit with an exciter signal and receiving from the at least one probe unit a received signal;

ascertaining with the at least one electronics unit from the received signal at least one capacitance value associable with a fill level of the medium; characterized in that coating the at least one probe unit with an insulation layer, and the at least one coated probe unit is connected with the at least one electronics unit;

inserting the at least one coated probe unit into a container with a calibration medium; and covering the at least one coated probe unit completely by the calibration medium, wherein:

while the at least one probe unit is completely covered, an associated received signal is gained; and on the basis of the associated received signal, at least one adjustable component of the at least one electronics unit is set.

2. The method as claimed in claim 1, wherein:
based on the complete covering, the greatest possible capacitance value is ascertained.

3. The method as claimed in claim 1, wherein:
with the associated received signal, a resolution of an analog/digital converter arranged in the at least one electronics unit is set.

4. The method as claimed in claim 3, wherein:
an amplitude of the exciter signal is set in such a manner, that a resolution range of the analog/digital converter is essentially completely utilized.

5. The method as claimed in claim 1, wherein:
the at least one probe unit is coated with the insulation layer in such a manner, that a thickness of the insulation layer lies in a micrometer range.

6. The method as claimed in claim 1, wherein:
with the associated received signal, that component of the at least one electronics unit is set, which determines an amplitude of the exciter signal.

7. The method as claimed in claim 1, wherein:
with the associated received signal, at least one adjustable component of the at least one electronics unit is set in such a manner, that an amplitude of the received signal is at its maximum in the case of complete covering.

\* \* \* \* \*